United States Patent [19]

Dockus

[11] Patent Number: 4,602,731
[45] Date of Patent: Jul. 29, 1986

[54] DIRECT LIQUID PHASE BONDING OF CERAMICS TO METALS

[75] Inventor: Kostas F. Dockus, Cicero, Ill.

[73] Assignee: Borg-Warner Corporation, Chicago, Ill.

[21] Appl. No.: 685,683

[22] Filed: Dec. 24, 1984

[51] Int. Cl.$^4$ ............................................. B23K 1/04
[52] U.S. Cl. ..................................... 228/121; 228/122; 228/124; 228/198
[58] Field of Search ............... 228/121, 122, 124, 194, 228/198

[56] References Cited

U.S. PATENT DOCUMENTS

| | | | |
|---|---|---|---|
| 2,739,375 | 3/1956 | Coxe | 228/121 |
| 2,857,663 | 10/1958 | Beggs . | |
| 3,057,445 | 10/1962 | Bronnes | 189/36.5 |
| 3,110,571 | 11/1963 | Alexander | 228/122 X |
| 3,482,305 | 12/1969 | Dockus et al. . | |
| 3,517,432 | 6/1970 | Sandstrom . | |
| 3,766,634 | 10/1973 | Babcock et al. . | |
| 3,908,886 | 9/1975 | Raske | 228/1.1 |
| 3,970,237 | 7/1976 | Dockus | 228/208 |
| 3,994,430 | 11/1976 | Cusano et al. | 228/122 |
| 4,019,080 | 4/1977 | Besson | 228/122 X |
| 4,028,200 | 6/1977 | Dockus | 204/43 T |
| 4,483,810 | 11/1984 | Bunk et al. | 264/60 |
| 4,488,673 | 12/1984 | Hopper, Jr. | 228/122 |
| 4,552,301 | 11/1985 | Liehr et al. | 228/263.12 |

FOREIGN PATENT DOCUMENTS 190880  11/1983  Japan ................................. 228/122

OTHER PUBLICATIONS

Chemical Abstracts, Issue 10, 1984–No. 100:160970C.

*Primary Examiner*—Kenneth J. Ramsey
*Attorney, Agent, or Firm*—James A. Geppert

[57] ABSTRACT

The direct liquid phase bonding of ceramics to metals or other ceramics in an inert atmosphere without prior metallization wherein a nickel-plated aluminum-silicon brazing alloy or aluminum or aluminum alloy filler material between the ceramic and metal layers provides a joint of high strength at a low bonding temperature without affecting the ceramic microstructure or the mechanical properties of the materials. This technique is also useful for fabricating composite laminates.

13 Claims, 18 Drawing Figures

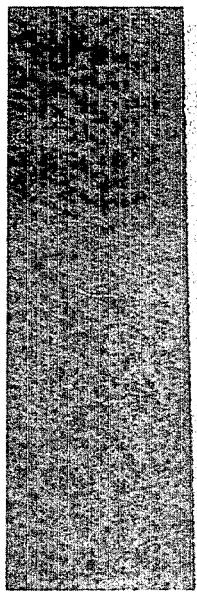
FIG.9.
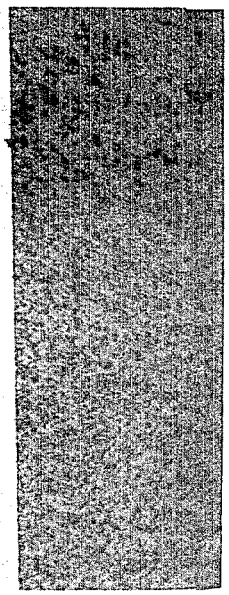
FIG.10.
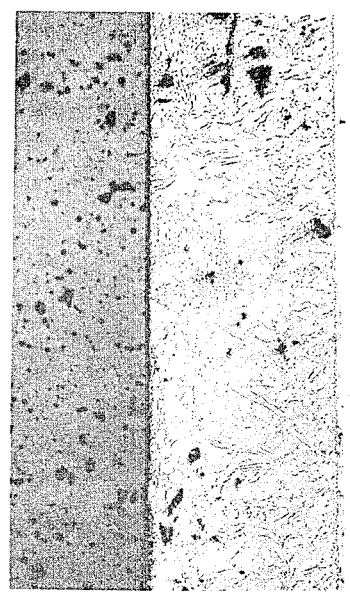
FIG.12.
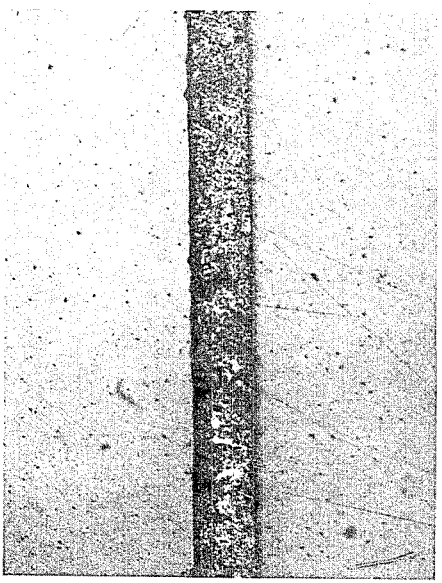
FIG.11.
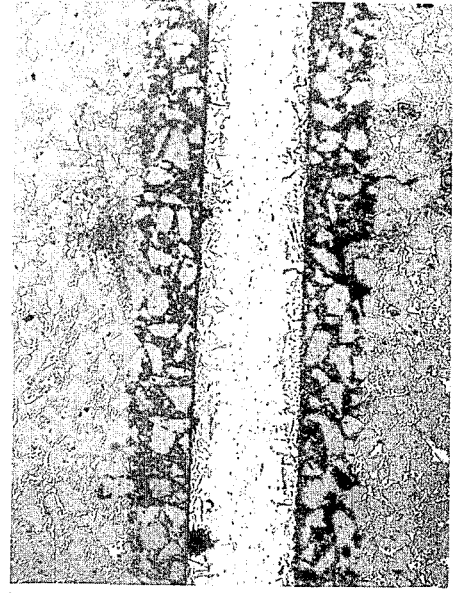

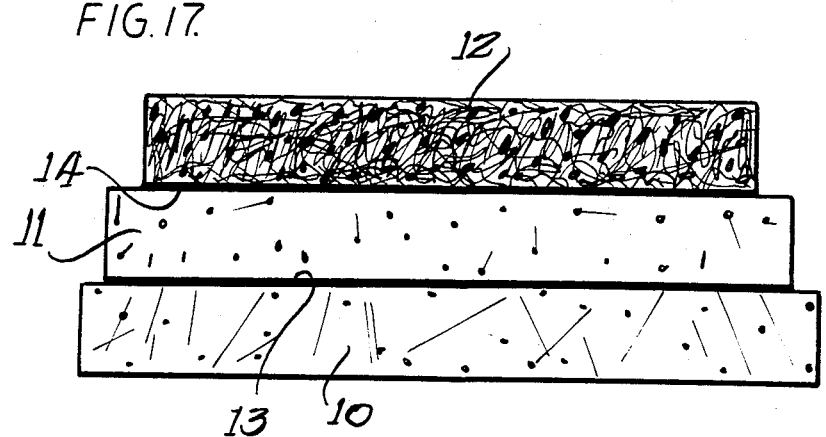
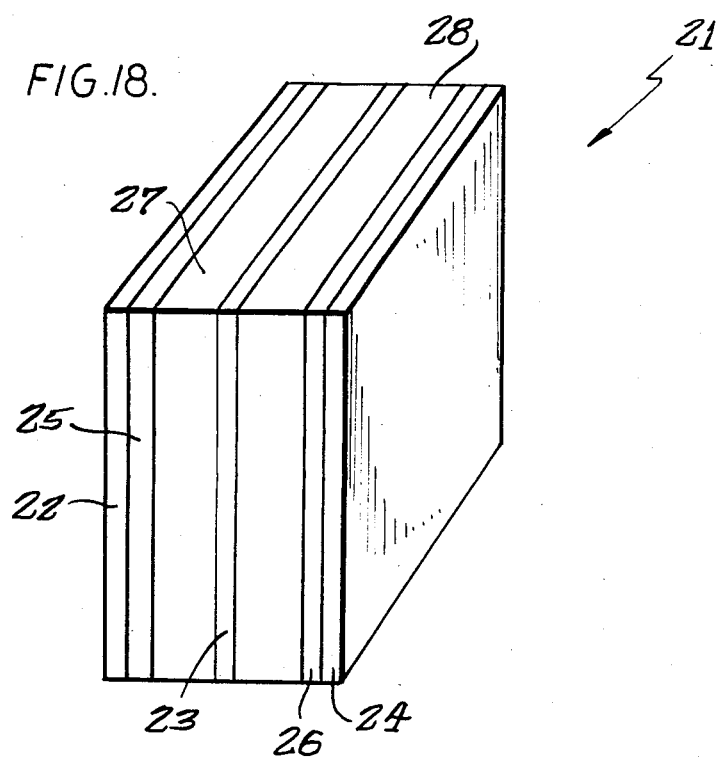

DIRECT LIQUID PHASE BONDING OF CERAMICS TO METALS

BACKGROUND OF THE INVENTION

High-technology ceramics are subjects of growing interest in view of their excellent mechanical properties under stress, outstanding electrical and optical properties, and exceptional resistance to high temperatures and corrosive environments. They are useful in automobile engines, burner nozzles and heat exchangers. In view of their electrical properties, they are useful in capacitors, piezoelectric devices, thermistors, solar cells and integrated circuit substrates. Ceramics can also be used in lasers, cutting tools and bearings.

The present invention relates to bonding of ceramics to metals or other ceramics to provide a joint of high strength. Presently, there are several known methods for joining ceramics to metals or ceramics to ceramics. One of the most popular known techniques is the molybdenum-manganese process. In this process, a finely divided mixture of molybdenum and manganese powder is applied to the surface of a ceramic member, and the member is then fired in a reducing atmosphere at about 1400° C. (2250° F.) to sinter the metal powder to the ceramic surface. To this metallized surface, an easily solderable metal layer, such as nickel, may be applied by conventional techniques such as electroplating. A copper-silver eutectic material is then frequently utilized to braze the ceramic to a metal component.

In another popular technique generally referred to as the "active metal process", metallizing of the ceramic surface is achieved by coating the surface with titanium or zirconium hydride powder, placing a suitable brazing material over the layer of powder, and then firing in a vacuum at about 900° C. (1650° F.) to dissociate the hydride and form a bond between the ceramic and metal. This coated ceramic surface may then be bonded to a metal component. Unfortunately, the metallizing temperature range of 1600° to 2600° F. required for these processes is excessive for either alumina or zirconia because it provokes grain structure changes and also weakens the mechanical properties of the ceramic member. Nevertheless, these technologies are considered to be well established and widely used on a commercial basis.

Various other techniques have been used to attempt the bonding of a metal to a ceramic member wherein a variety of metals and/or alloys are initially bonded to the surface of the ceramic member to provide a metallized surface preparatory to the bonding of the metallized surface to the metal substrate. The present invention provides an improved joining process without the necessity of the extra steps to metallize the ceramic component.

SUMMARY OF THE INVENTION

The present invention comprehends the provision of a novel method for a direct liquid phase bonding of a ceramic or carbide material to a metal substrate or other ceramic at a relatively low temperature in an inert atmosphere or vacuum to provide a joint of high strength without affecting the ceramic microstructure or mechanical properties. The technique of the present invention involves the use of an aluminum-silicon filler metal or brazing alloy, any other aluminum alloy or pure aluminum, plated with a thin film of nickel, a nickel-lead alloy or a cobalt-lead alloy, interposed between the ceramic and metal members, and a single firing at a relatively low temperature of the assembled layers under an inert atmosphere or vacuum.

The present invention also comprehends the provision of a novel method for liquid phase bonding of a wide variety of ceramic materials to a wide variety of metal substrates. This method will also work where two ceramic members are to be bonded together.

The present invention further comprehends the method of forming laminate composites using the present brazing process. This method provides laminate composites of unusual combinations exhibiting properties of high strength-to-weight ratio beyond the capabilities of presently known metals or alloys. Also, reinforcing materials, either of metallic or non-metallic origin, have been successfully incorporated into layered composites.

Further objects are to provide a method of maximum simplicity, efficiency, economy and ease of operation, and such further objects, advantages and capabilities as will later more fully appear and are inherently possessed thereby.

DESCRIPTION OF THE DRAWINGS

FIG. 9 is a microstructure of zirconia bonded to zirconia.

FIG. 10 is a microstructure of silicon nitride bonded to silicon nitride.

FIG. 11 is a microstructure of silicon carbide bonded to silicon carbide.

FIG. 12 is a microstructure of zirconia bonded to Kovar.

FIG. 17 is a cross sectional view of silicon nitride bonded to alumina, which in turn is bonded to cast iron.

FIG. 18 is a perspective view of a laminate composite wherein the layers are bonded together utilizing the present bonding process.

DESCRIPTION OF THE PREFERRED EMBODIMENTS

Figure 1:
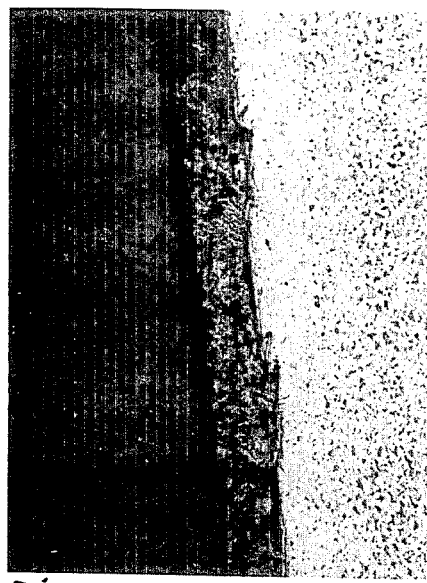
FIG. 1 is a microstructure of zirconia bonded to steel by the present process.
Figure 2:
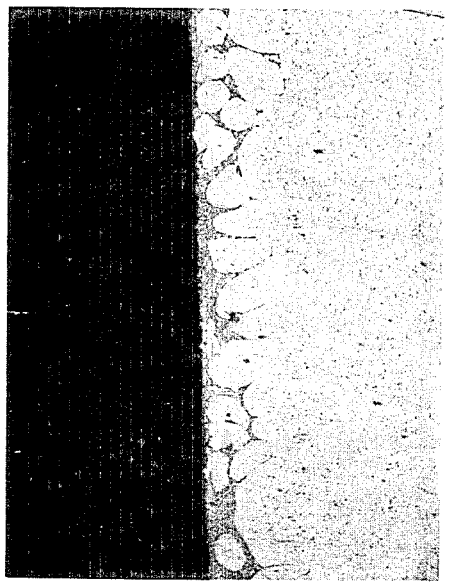
FIG. 2 is a microstructure of zirconia bonded to aluminum.
Figure 3:
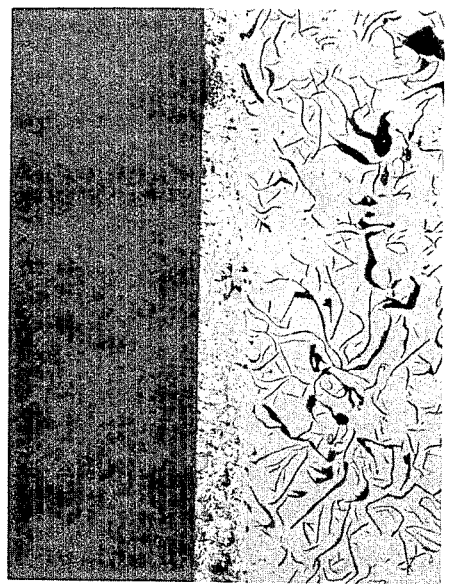
FIG. 3 is a microstructure of zirconia bonded to cast iron.
Figure 4:
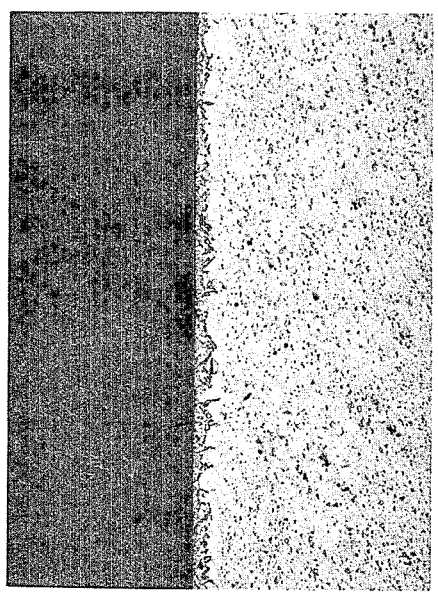
FIG. 4 is a microstructure of alumina bonded to aluminum.
Figure 6:
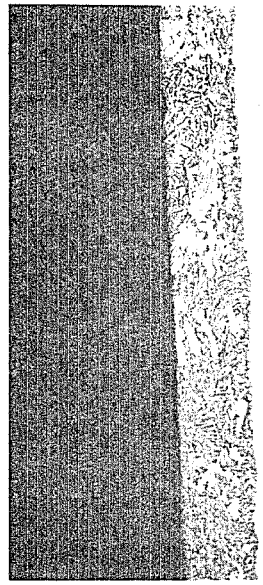
FIG. 6 is a microstructure of alumina bonded to titanium.
Figure 8:
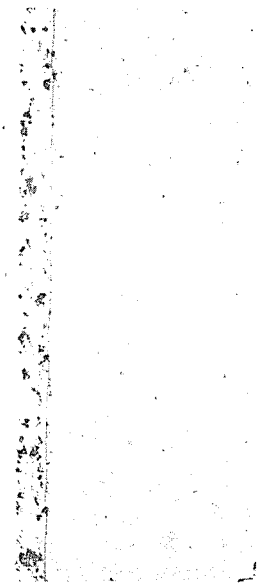
FIG. 8 is a microstructure of tungsten carbide bonded to stainless steel.
Figure 5:
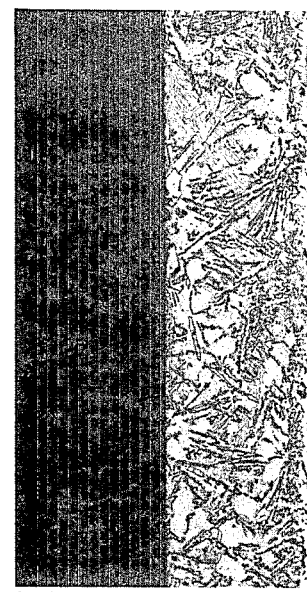
FIG. 5 is a microstructure of alumina bonded to steel.
Figure 7:
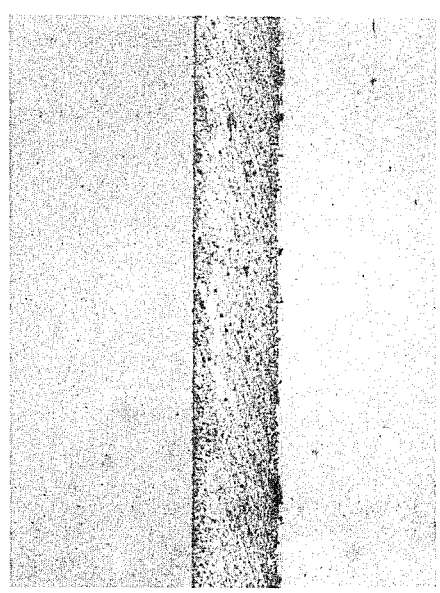
FIG. 7 is a microstructure of tungsten carbide bonded to titanium.

The present invention relates to a direct liquid phase bonding of ceramics or carbides to metals or other ceramics which is a very practical and economical method of providing joints of high strength at a low temperature without affecting the ceramic microstructure or mechanical properties. This joining of a ceramic to a chosen metal, another ceramic or to the same material utilizes an aluminum-silicon brazing sheet or aluminum filler metal, such as pure aluminum or any aluminum alloy. It was found that the eutectic (11.6% Si-Al) or nearly eutectic liquid of aluminum-silicon alloy, when plated with a thin film of nickel, nickel-lead alloy or cobalt-lead alloy, which melts between the ceramic and metal layers at a temperature in the range of 1000° to 1150° F. under inert atmosphere or vacuum, wets oxide ceramics or carbides very well. After cooling and solidification of the filler metal, a very strong bond between the ceramic or carbide and base metal is established. Considering FIGS. 1 through 8, a bond is formed between the adjacent members of zirconia-cast iron, alumina-aluminum, alumina-steel, alumina-titanium, tungsten carbide-titanium and tungsten carbide-stainless steel, by a chemical exothermic reaction of an aluminum-silicon alloy with nickel forming a ternary eutectic. This reaction liberates heat which aids in the formation of the eutectic and promotes additional reactivity at the metal-liquid-ceramic interface. Only one firing operation is required which results in excellent wetting and interdiffusion of the alloy with the ceramic and base metal.

The process broadly consists of cleaning both layers of material by appropriate cleaning means, sandwiching the filler metal or brazing sheet between the layers, firing the article at a temperature in the range of 1100° F. to 1200° F. in either a dry inert atmosphere (e.g. nitrogen, argon, helium, etc.) or a vacuum (approximately 10 millitorr or lower) for a time interval in the range of three to five minutes, with appropriate preheating and cooling. Wettability of the metallic surface was found to be dependent upon contaminates and the protective atmosphere; therefore the inert atmosphere or vacuum was used to provide a level of less than 20 ppm oxygen and a dew point of at least −40° F.

As a specific example of the bonding process, a zirconia disc and a steel disc were cleaned as was the brazing alloy. For the ceramic piece, vapor degreasing and solvent degreasing using acetone and alcohol was sufficient to produce a clean surface. For the metal surfaces, a typical cleaning and plating sequence involved:
1. Dip in 5 to 10% caustic etch for one to two minutes at room temperature.
2. Water rinse.
3. Acid rinse for fifteen to thirty seconds.
4. Water rinse.
5. Demineralized water rinse.
6. Electroless nickel plating for 2 to 5 minutes at 180° F. (82° C.).
7. Water rinse and dry.

In step 6, the electroless nickel plating may be replaced by electrolytic plating, vapor deposition, sputtering, ion plating or other techniques.

Once cleaned, the zirconia, nickel-plated brazing alloy shim stock and nickel-plated steel substrate were assembled, heated to a temperature of 1150° F. in a single firing operation in a dry inert atmosphere of nitrogen for a time period of approximately five minutes and then cooled. The specific firing sequence involves placing the sandwich in a furnace, sealing the furnace, purging with dry nitrogen and holding in a low temperature zone until the temperature reached 500° F., transferring to a high temperature zone and holding for five minutes after reaching 1150° F., moving to a low temperature zone until the temperature of the brazed piece reaches 500° F., and then removing and air cooling.

This brazing process is very effective in producing a reliable, strong bond between the ceramic and metal. Apparently there are no standardized tests of a ceramic to metal joint, however a test apparatus was devised for shear strength with the following results:
(1) Zirconia to steel—minimum of 4300 psi.
(2) Zirconia to aluminum—minimum of 4500 psi.
If necessary, a thin aluminum brazing sheet can be used instead of shim stock filler metal and is beneficial because it effectively accommodates differential stresses between adjacent members to be joined which have significantly different coefficients of expansion. Additional combinations of ceramics to metals or other ceramics are shown in the following table:

TABLE I

| | Cast Iron | Aluminum 3003, 6061 | Stainless Steel 304 | Steel 1020 | Titanium 6Al-4V | Kovar | Zirconia | Alumina | Silicon Carbide | Silicon Nitride |
|---|---|---|---|---|---|---|---|---|---|---|
| Zirconia | X | X | X | X | X | X | X | X | X | |
| Alumina | X | X | X | X | X | | X | X | X | X |
| Tungsten Carbide | | X | X | | X | | | X | | |
| Silicon Carbide | | XX | | | | X | X | X | X | |
| Silicon Nitride | XX | X | | XX | | X | | X | | X |

X — Good Bond
XX — Fractured Carbide on Cooling

Where the space is blank, the material combination was not tried. In the instances where the carbide layer fractured upon cooling, the bond between the carbide layer and the substrate was effective, however, the difference between the coefficients of thermal expansion of the two materials was too great, and the brittle carbide layer cracked due to the greater contraction of the substrate upon cooling.

Figure 14:
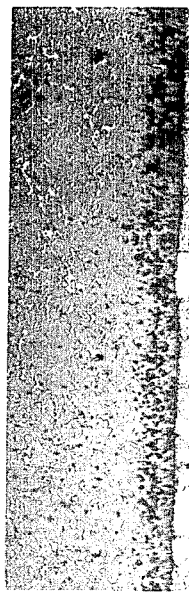
FIG. 14 is a microstructure of silicon carbide bonded to Kovar.
Figure 16:
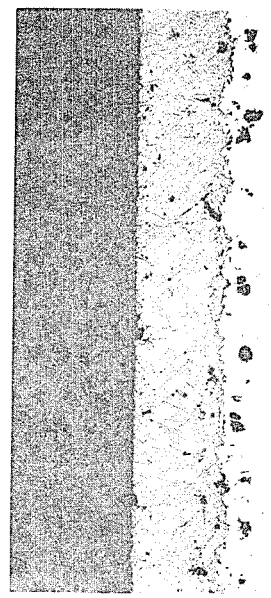
FIG. 16 is a microstructure of alumina bonded to steel.
Figure 13:
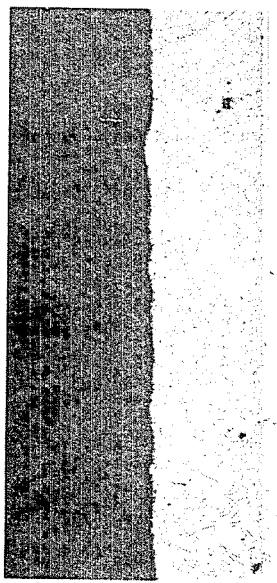
FIG. 13 is a microstructure of silicon nitride bonded to Kovar.
Figure 15:
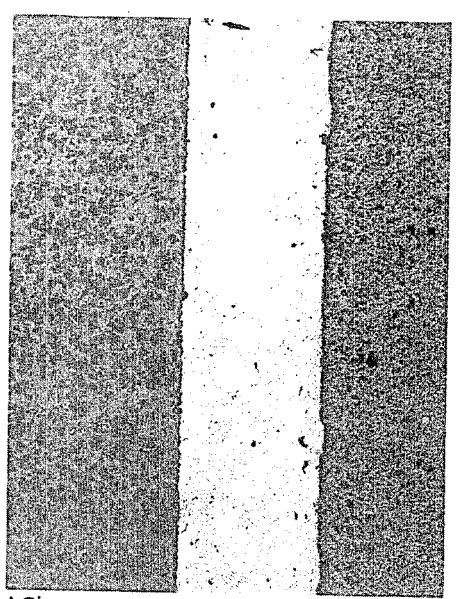
FIG. 15 is a microstructure of alumina bonded to silicon nitride.

All of the above examples, many of which are shown in the microstructures of FIGS. 1 through 16, have been bonded utilizing the brazing process detailed previously. Kovar is a trademark for an alloy consisting of 54% iron, 28% nickel and 18% cobalt and is utilized because Kovar and ceramics having similar coefficients of expansion.

As above noted, where the carbide layer fractured on cooling, a suitable interlayer between the carbide and base metal may be interposed between the layers to act as a buffer to allow brazing to take place without cracking of the ceramic or separation at the interface upon cooling. Such an interlayer for bonding silicon nitride to cast iron is a 0.020 to 0.025 inches thick layer of alumina. As shown in FIG. 17, a thin layer of alumina 11 is utilized between the cast iron base material 10 and the silicon carbide layer 12; the sheets 13 and 14 of nickel-plated aluminum filler material being interposed between the layers 10, 11 and 12. Also, a similar intermediate layer is used for the bonding of silicon nitride to steel, zirconia to silicon nitride or silicon carbide and alumina to silicon carbide or silicon nitride. Where alumina is a principal layer being bonding, a thin layer of Kovar can be substituted for the thin alumina layer.

Applications for this technology would include adiabatic diesel engines wherein piston caps and cylinder liners would be of ceramic material, turbochargers, electronics, and wear resistant applications, such as sleeve bearings, tappet surfaces and cam surfaces.

In FIG. 18, a composite laminate 21 is disclosed which also is formed by the brazing technique previously described. Many methods are available for fabricating composites containing whiskers, fibers or fine wires. The most popular techniques are casting processes which involve infiltration of a filament array with molten aluminum alloy or power metallurgical methods which usually involve hot pressing of metal powder-fiber mixtures or cold pressing and sintering.

The present technique provides a method of brazing aluminum brazing sheets to other reinforcing materials of suitable metallic or non-metallic components, producing laminate composites of high strength-to-weight ratio. In a layered composite, one metal layer can match another layer or be composed of a different thickness or dissimilar material for benefits such as strength, stiffness, corrosion resistance, wear properties or material cost. Special sizes in gauge, length and width can be made within limitations of the manufacturing and brazing equipment.

Various types of reinforcing material layers includes graphite fibers, ceramics, common metals or refractory metals. As seen in FIG. 18, a laminate composite 21 includes three layers of 0.010 inches thick alumina 22, 23 and 24, two layers of 0.010 inches thick aluminized steel 25 and 26, and two layers of 0.050 inches thick aluminum brazing sheet 27 and 28. All aluminum components and, if necessary, all reinforcing material layers are plated with a bond-promoting metal such as nickel, prior to brazing. Brazing is carried out under vacuum conditions or in a controlled inert atmosphere. As heating occurs, an exothermic reaction takes place when the nickel deposit reacts with aluminum to form a new brazing metal which has a lower viscosity and excellent wettability characteristics to wet not only metallic, but non-metallic components as well.

I claim:

1. A method of bonding at least two material layers together, at least one layer being a ceramic, comprising the steps of cleaning the surfaces of the layers to be bonded, plating a brazing alloy sheet with nickel, nickel-lead or cobalt-lead, sandwiching the plated brazing alloy between the material layers to be bonded, heating the material layers and brazing alloy to a temperature in the range of 1100° to 1200° F. for a time period of three to five minutes in an inert atmosphere or vacuum, and cooling the bonded article.

2. A method of bonding as set forth in claim 1, wherein one of said layers is a ceramic material and the other layer is a metal.

3. A method of bonding as set forth in claim 2, in which said metallic layer is selected from the group consisting of cast iron, steel, stainless steel, aluminum, titanium and an alloy of iron, nickel and cobalt.

4. A method of bonding as set forth in claim 3, wherein said metallic layer is plated with a thin film of nickel, nickel-lead or cobalt-lead.

5. A method of bonding as set forth in claim 1, in which both of said layers are ceramic materials.

6. A method of bonding as set forth in claim 5, in which the ceramic materials of the two layers are identical.

7. A method of bonding as set forth in claim 1, wherein said ceramic layer is selected from the group consisting of zirconia, alumina, tungsten carbide, silicon carbide and silicon nitride.

8. A method of bonding as set forth in claim 7, wherein said ceramic layer is plated with a thin film of nickel, nickel-lead or cobalt-lead.

9. A method of bonding as set forth in claim 1, in which said heating step is carried out in a vacuum.

10. A method of bonding as set forth in claim 1, in which said inert atmosphere is selected from the group consisting of nitrogen, argon and helium.

11. A method of bonding as set forth in claim 1, in which said heating step includes a preheating stage in a furnace to raise the layers to 500° F., a high temperature stage in the range of 1100° to 1200° F., and a low temperature stage allowing the article to cool to 500° F. before removing from the furnace.

12. A method of bonding as set forth in claim 1, in which a layer of alumina or Kovar is interposed between the metal and ceramic layers when the metal and ceramic layers have a substantial difference in the coefficients of expansion.

13. A method of bonding as set forth in claim 12, in which a sheet of a brazing alloy or aluminum filler material is interposed between all three layers.

* * * * *